United States Patent

Yasuno et al.

[11] Patent Number: 5,303,989
[45] Date of Patent: Apr. 19, 1994

[54] VEHICLE DYNAMIC CHARACTERISTIC CONTROL APPARATUS

[75] Inventors: Yoshiki Yasuno; Ken Ito, both of Yokohama, Japan

[73] Assignee: Nissan Motor Co., Ltd., Yokohama, Japan

[21] Appl. No.: 106,774

[22] Filed: Aug. 16, 1993

Related U.S. Application Data

[63] Continuation of Ser. No. 750,580, Aug. 27, 1991, abandoned.

[30] Foreign Application Priority Data

Sep. 18, 1990 [JP] Japan ............................ 2-246027

[51] Int. Cl.$^5$ ........................ B60K 31/00; B60T 8/64
[52] U.S. Cl. .................... 303/111; 303/113.5; 303/103
[58] Field of Search .............. 303/100, 103, 106, 109, 303/111, 9.62, 113.5; 180/142; 363/426.1, 426.2

[56] References Cited

U.S. PATENT DOCUMENTS

| | | | |
|---|---|---|---|
| 3,840,278 | 10/1974 | Fleischer et al. | 303/111 |
| 4,679,809 | 7/1987 | Ito et al. | 280/91 |
| 4,755,945 | 7/1988 | Kade et al. | 303/100 |
| 4,763,262 | 8/1988 | Leiber | 303/100 |
| 4,779,696 | 10/1988 | Harada et al. | 303/99 |
| 4,805,104 | 2/1989 | Kishimoto et al. | 303/111 |
| 4,809,181 | 2/1989 | Ito et al. | 303/100 |
| 4,840,243 | 6/1989 | Hirabayashi et al. | 303/100 |
| 4,902,076 | 2/1990 | Ushiama et al. | 303/100 |

FOREIGN PATENT DOCUMENTS

| | | |
|---|---|---|
| 3719821 | 12/1986 | Fed. Rep. of Germany . |
| 3616907 | 11/1987 | Fed. Rep. of Germany . |
| 3731756 | 3/1989 | Fed. Rep. of Germany . |
| 61-67665 | 4/1986 | Japan . |

*Primary Examiner*—Matthew C. Graham
*Attorney, Agent, or Firm*—Foley & Lardner

[57] ABSTRACT

A vehicle dynamic characteristic control apparatus for use with an automotive vehicle supported on a pair of front wheels and a pair of rear wheels. The apparatus comprises a first unit for controlling a steering angle of one of the wheel pairs, a second unit for controlling braking forces to be applied to left and right wheels of at least one of the wheel pairs, and a third unit coupled to the sensor means for controlling the first and second units. The third unit calculates a target value for a dynamic parameter related to a motion of the vehicle based upon the sensed vehicle operating conditions. The third unit controls the first unit to bring the dynamic parameter to the target value. In the presence of vehicle braking, the third unit calculates changes in cornering powers of the respective wheel pairs and controls the second unit to provide a difference between the braking force applied to the left wheel and the braking force applied to the right wheel so as to cancel an influence of the cornering power changes on the dynamic parameter.

6 Claims, 9 Drawing Sheets

VEHICLE DYNAMIC CHARACTERISTIC CONTROL APPARATUS This application is a continuation of application Ser. No. 07/750,580, filed Aug. 27, 1991, now abandoned.

BACKGROUND OF THE INVENTION

This invention relates to a vehicle dynamic characteristic control apparatus for use with an automotive vehicle.

For example, Japanese Patent Kokai No. 61-67665 discloses a vehicle steering control apparatus for controlling a vehicle dynamic characteristic based upon various vehicle operating conditions. The apparatus includes a control unit for calculating a target yaw rate from a vehicle model specifying the target yaw rate as a function of vehicle speed and vehicle steering condition. The control unit controls the rear-wheel steering angle to achieve the target yaw rate.

During vehicle braking, however, the tire frictional forces serve to brake the vehicle and the front- and rear-wheel cornering forces change from those produced in the absence of vehicle braking. As a result, the transient and steady characteristics of the produced yaw rate are different in the presence of vehicle braking than in the absence of vehicle braking. For this reason, it is impossible, during vehicle braking, to bring the produced yaw rate into coincidence with the target yaw rate value merely by controlling the rear-wheel steering angle.

SUMMARY OF THE INVENTION

Therefore, a main object of the invention is to provide an improved steering control apparatus which can provide good steady and transient characteristics for a vehicle dynamic parameter regardless of vehicle braking.

It is another object of the invention to provide an improved vehicle dynamic characteristic control apparatus which can provide good yaw rate characteristics in terms of yaw rate response (transient characteristic) and yaw rate gain (steady characteristic) regardless of vehicle braking.

There is provided, in accordance with the invention, a vehicle dynamic characteristic control apparatus for use with an automotive vehicle supported on a pair of front wheels and a pair of rear wheels. The apparatus comprises a first unit for controlling the steering angle of one of the wheel pairs, a second unit for controlling braking forces to be applied to left and right wheels of at least one of the wheel pairs, and sensor means sensitive to operating conditions of the vehicle for providing sensor signals indicative of sensed vehicle operating conditions. The apparatus also comprises a third unit coupled to the sensor means for controlling the first and second units. The third unit includes first means for calculating a target value for a dynamic parameter related to a motion of the vehicle based upon the sensed vehicle operating conditions. The first means controls the first unit to bring the dynamic parameter to the target value. The third unit also includes second means operable in the presence of vehicle braking for calculating changes in cornering powers of the respective wheel pairs. The second means controls the second unit to provide a difference between the braking force applied to the left wheel and the braking force applied to the right wheel so as to cancel the influence of the changes in cornering power on the dynamic parameter.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
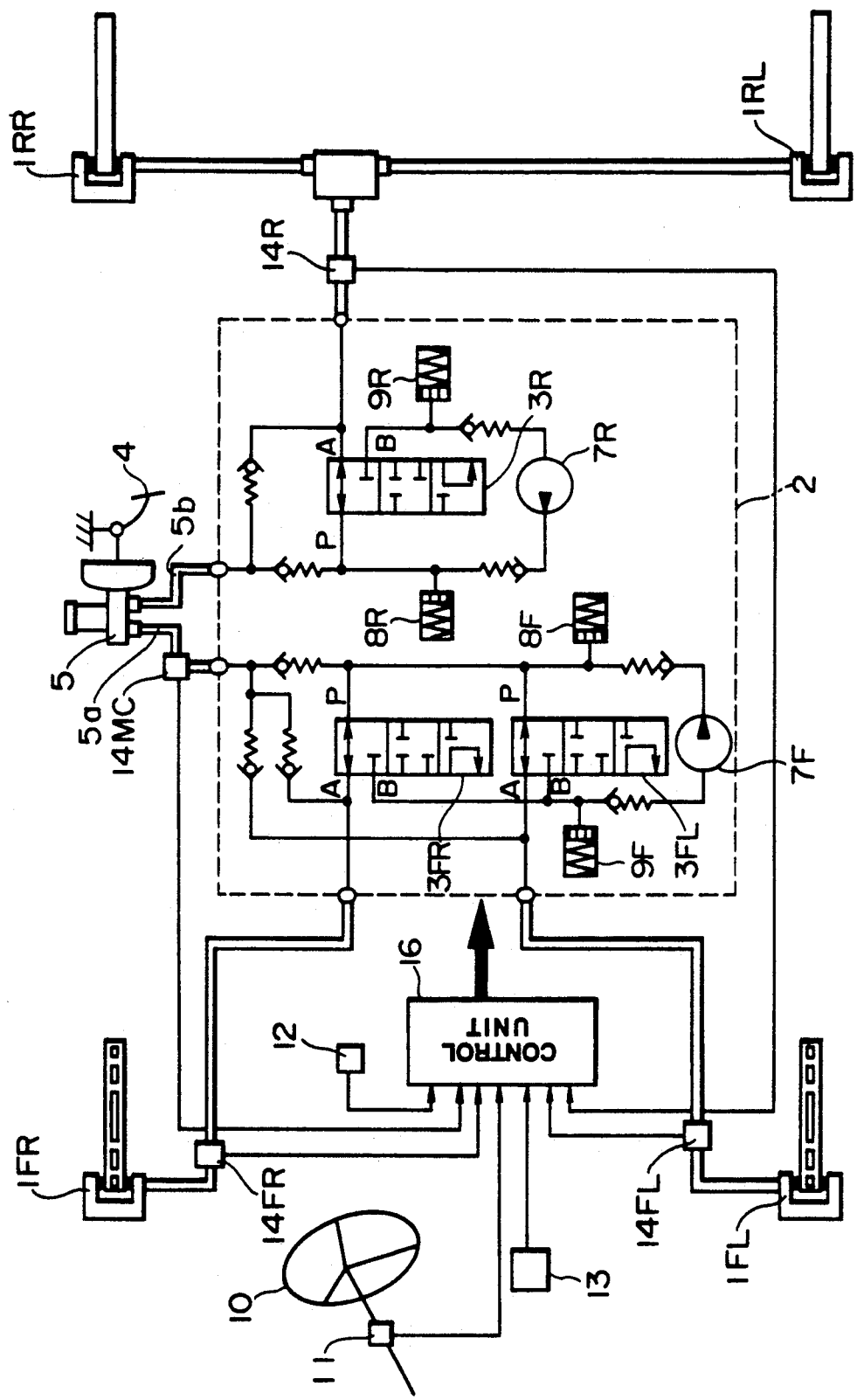
FIG. 1 is a schematic diagram showing a braking force control unit used in one embodiment of a vehicle dynamic characteristic control apparatus embodying the invention.

With reference to the drawings, and in particular to FIG. 1, there is shown a schematic diagram of a braking force control unit used in a vehicle dynamic characteristic control apparatus embodying the invention. The invention will be described in connection with an automotive vehicle supported on a pair of front road wheels associated with respective front wheel cylinders 1FL and 1FR situated in front wheel brakes for application of brakes to the respective front road wheels and a pair of rear road wheels associated with respective rear wheel cylinders 1RL and 1RR situated in rear wheel brakes for application of brakes to the respective rear road wheels. An actuator, generally designated by the numeral 2, operates the wheel cylinders 1FL, 1FR, 1RF and 1RR for applying controlled braking forces to the respective road wheels. The numeral 4 designates a brake pedal which actuates the pistons in a tandem master cylinder 5 and forces fluid through first and second conduits 5a and 5b to the actuator 2.

The actuator 2 includes solenoid valves 3FL, 3FR and 3R. The solenoid valve 3FL has three ports A, B and P. The port P is connected to the first conduit 5a, the port A is connected to the wheel cylinder 1FL, and the port B is connected to the first conduit 5a through a motor driven pump 7F. A reservoir 9F is connected to the conduit connected between the port B and the pump 7F. An accumulator 8F is connected to the conduit connected between the pump 7F and the port P for charging up the fluid flow through the conduit. The solenoid valve 3FL operates on a command current signal fed thereto from a control unit 16 to occupy one of three positions. The first position, illustrated in FIG. 1, is occupied to provide communication between the ports P and A so as to increase the fluid pressure introduced into the wheel cylinder 1FL. The second position is encountered to interrupt the communication between the ports P and A so as to retain the fluid pressure in the wheel cylinder 1FL at a constant value. The third position is encountered to provide communication between the ports A and B so as to reduce the fluid pressure in the wheel cylinder 1FL.

Similarly, the solenoid valve 3FR has three ports A, B and P. The port P is connected to the first conduit 5a and also to the port P of the solenoid valve 3FL, the port A is connected to the wheel cylinder 1FR, and the port B is connected to the port B of the solenoid valve 3FL. The solenoid valve 3FR operates on a command current signal fed thereto from the control unit 16 to occupy one of three positions. The first position, illustrated in FIG. 1, is occupied to provide communication between the ports P and A so as to increase the fluid pressure introduced into the wheel cylinder 1FR. The second position is encountered to interrupt the communication between the ports P and A so as to retain the fluid pressure in the wheel cylinder 1FR at a constant value. The third position is encountered to provide communication between the ports A and B so as to reduce the fluid pressure in the wheel cylinder 1FR.

The solenoid valve 3R has three ports A, B and P. The port P is connected to the second conduit 5b, the port A is connected to the wheel cylinders 1RL and 1RR, and the port B is connected to the second conduit 5b through a motor driven pump 7R. A reservoir 9R is connected to the conduit connected between the port B and the pump 7R. An accumulator 8R is connected to the conduit connected between the pump 7R and the port P for charging up the fluid flow through the conduit. The solenoid valve 3R operates on a command current signal fed thereto from the control unit 16 to occupy one of three positions. The first position, illustrated in FIG. 1, is occupied to provide communication between the ports P and A so as to increase the fluid pressure introduced to the wheel cylinders 1RL and 1RR. The second position is encountered to interrupt the communication between the ports P and A so as to retain the fluid pressure in the wheel cylinders 1RL and 1RR at a constant value. The third position is encountered to provide communication between the ports A and B so as to reduce the fluid pressure in the wheel cylinders 1RL and 1RR.

Each of the command current signals to the respective solenoid valves 3FL, 3FR and 3R has three levels repetitively determined from calculations performed by the control unit 16. These calculations are made based upon various conditions of the automotive vehicle that are sensed during its operation. These sensed conditions include steering angle $\theta$, vehicle speed Vx, brake pedal position, master cylinder pressure $P_{MC}$, fluid pressures $P_{FL}$ and $P_{FR}$ supplied to the respective wheel cylinders 1FL and 1FR, and fluid pressure PR supplied to the wheel cylinders 1RL and 1RR. Thus, a steering angle sensor 11, a vehicle speed sensor 12, a brake switch 13, and fluid pressure sensors 14MC, 14FL, 14FR and 14R are connected to the control unit 16.

The steering angle sensor 11 is provided to sense the degree $\theta$ of rotation of a steering wheel 10 with respect to its neutral position and it produces an electric signal indicative of the sensed steering angle $\theta$. The steering angle indication signal has a sign indicating the direction in which the steering wheel turns. In the illustrated case, the steering angle indication signal has a positive sign when the steering wheel 10 turns to the left with respect to its neutral position and a negative sign with the steering wheel 10 turns to the right with respect to its neutral position. The vehicle speed sensor 12 is provided to sense the vehicle longitudinal speed Vx and it produces an electric signal indicative of the sensed vehicle speed Vx. The brake switch 13 is associated with the brake pedal 4 to close to supply current from the engine battery to the control unit 16 in response to the application of foot braking to the vehicle (when the brake pedal 4 is depressed). The master cylinder pressure sensor 14MC is shown as positioned in the first conduit 5a to sense the fluid pressure $P_{MC}$ and it produces an electric signal indicative of the sensed pressure $P_{MC}$ of the fluid discharged from the master cylinder 5. The fluid pressure sensors 14FL and 14FR are positioned to sense the fluid pressures $P_{FL}$ and $P_{FR}$ introduced into the respective wheel cylinders 1FL and 1FR. The fluid pressure sensors 14FL and 14FR produce electric signals indicative of the sensed fluid pressures $P_{FL}$ and $P_{FR}$ to the control unit 16. The fluid pressure sensor 14R is positioned to sense the fluid pressure PF introduced into the wheel cylinders 1RL and 1RR. The fluid pressure sensors 14R produces an electric signal indicative of the sensed fluid pressure $P_R$ to the control unit 16.

The control unit 16 may employ a digital computer including an input interface, an output interface, a central processing unit, and a memory. The control processing unit communicates with the rest of the computer via data bus. The memory contains programs for operating the central processing unit and further contains appropriate data (vehicle model) used in calculating appropriate command signal values. The vehicle model may be derived from equations of motions of a vehicle similar to the vehicle to be controlled. The calculated command signal valves are transferred by the central processing unit to the output interface which converts them into analog form for application to respective floating type constant current circuits. The constant current circuits set the solenoid valves 3FL, 3FR and 3R and the pumps 7F and 7R according to the calculated values for them to perform anti-skid control and braking force differential control.

When the solenoid valves 3FL and 3FR are turned off (in the first position), fluid pressure is introduced from the master cylinder 5 into the front wheel cylinders 1FL and 1FR. In this case, both of the fluid pressure $P_{FL}$ and $P_{FR}$ are equal to the master cylinder fluid pressure $P_{MC}$. If the pump 7F is turned on with one of the solenoid valves 3FL and 3FR being turned on, the one solenoid valve 3FL or 3FR will move to its second or third position to reduce the fluid pressure in the corresponding wheel cylinder so as to produce a difference between the fluid pressures in the front wheel cylinders 1FL and 1FR. This difference provides a difference between the braking force applied to the front-left wheel and the braking force applied to the front-right wheel.

Figure 2:
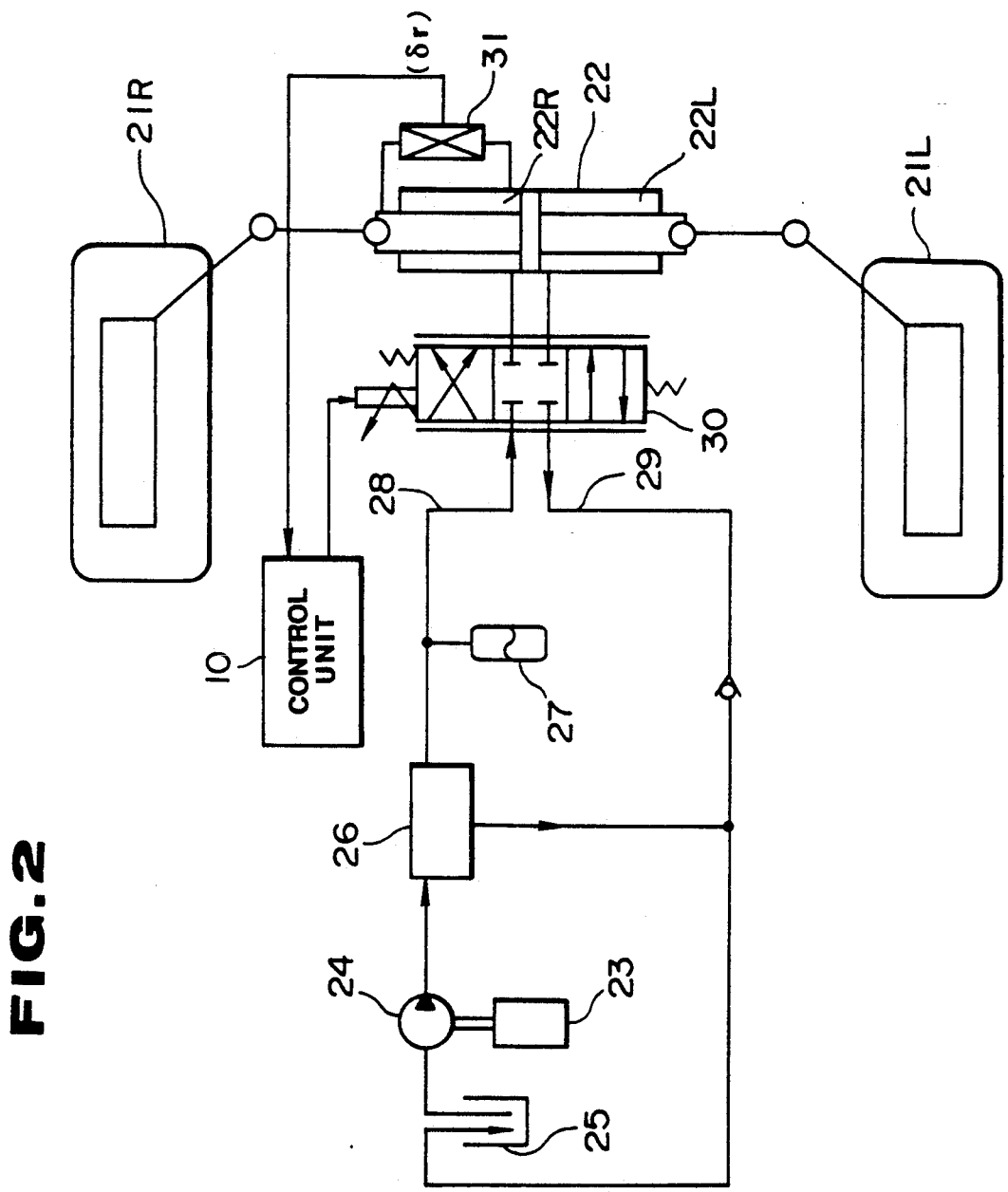
FIG. 2 is a schematic diagram showing a rear-wheel steering control unit used in the vehicle dynamic characteristic control apparatus of the invention.

Referring to FIG. 2, there is shown a rear-wheel steering control unit used in the vehicle dynamic characteristic control apparatus of the invention. The rear wheels 21L and 21R are associated with an auxiliary steering actuator 22 of the spring center type having two pressure chambers 22L and 22R for turning the rear wheels 21L and 21R in response to the fluid pressure acting in the first or second pressure chamber 22L or 22R. The auxiliary steering actuator 22 turns the rear wheels 21L and 21R in a counter-clockwise direction at an angle proportional to the fluid pressure introduced into the first pressure chamber 22L with respect to the vehicle longitudinal axis and it turns the rear wheels 21L and 21R in the clockwise direction at an angle proportional to the fluid pressure introduced into the second pressure chamber 22R with respect to the vehicle longitudinal axis. A pump 24, which is driven by the engine 23, supplies fluid from a reservoir 25 through an unloading valve 26 to cause an accumulator 27 to be charged up the fluid flow through a conduit 28.

The rear-wheel steering control unit includes a control valve 30 operable on a command current signal fed thereto from the control unit 16 to occupy one of three positions. The first position is occupied when the command current signal is a first level and the control valve 30 provides communication of the first chamber 22L of the auxiliary steering actuator 22 with the conduit 28 and communication of the second chamber 22R of the auxiliary steering actuator 22 with a drain conduit 29 which is connected through a check valve to the reservoir 25. As a result, the rear wheels 21L and 21R turn in the counter-clockwise direction. The second position, illustrated in FIG. 2, is occupied when the command current signal is a level of zero and the control valve 30 interrupts the communication of the auxiliary steering actuator 22 with the conduits 28 and 29 to retain the existing rear-wheel steering angle. The third position is encountered when the command current signal is a second level and the control valve 30 provides communication of the first pressure chamber 22L with the drain conduit 29 and communication of the second pressure chamber 22R with the conduit 28. As a result, the rear wheels 21L and 21R turn in the clockwise direction. A rear-wheel steering angle sensor 31 is provided to sense the steering angle of the rear wheels 21L and 21R. The rear-wheel steering angle sensor 31 provides a feedback signal to the control unit 16 to ensure that the rear-wheel steering angle is correct to maintain a target value calculated by the control unit 16.

Figure 3:
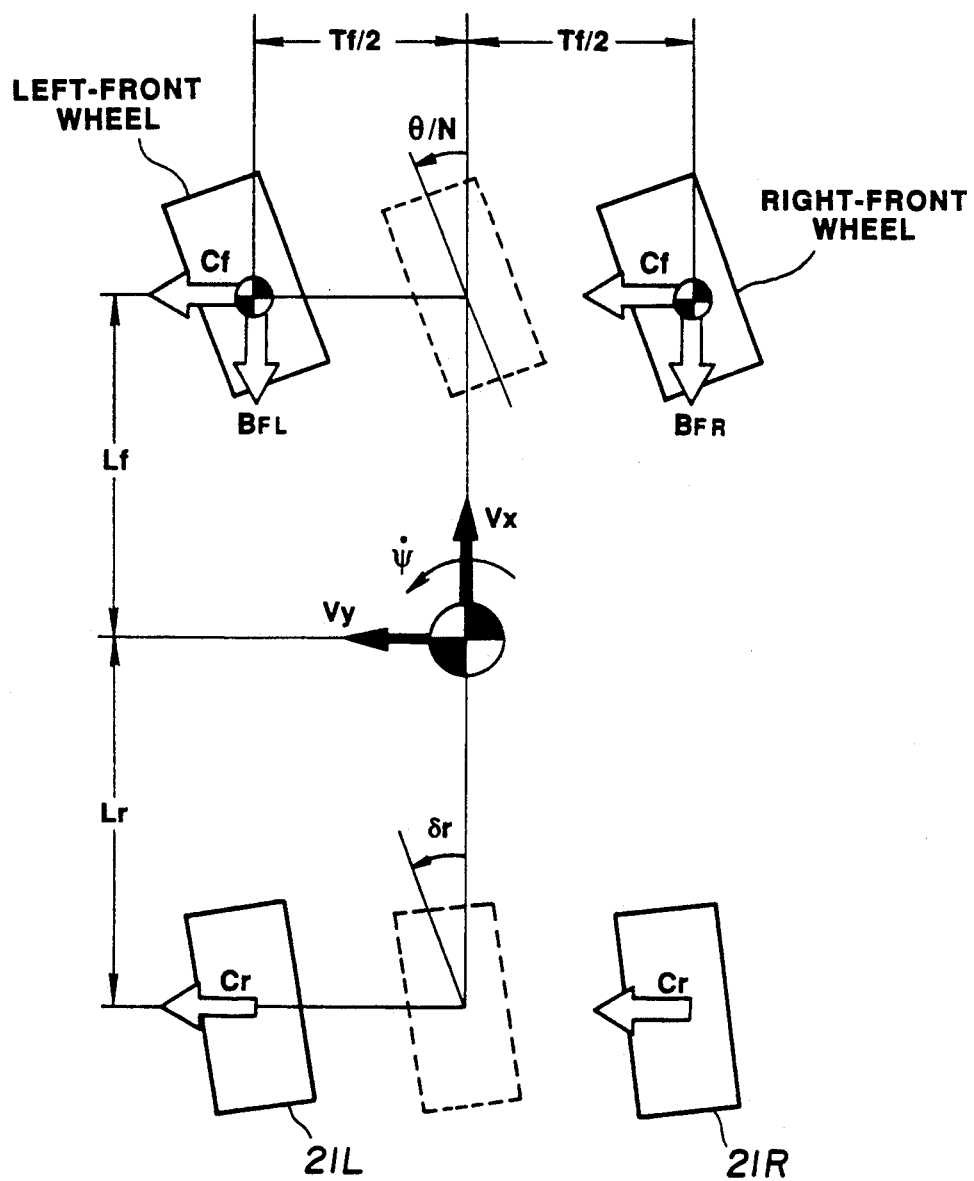
FIG. 3 is a diagram showing a model of an automotive vehicle having two degrees of freedom.

The principles of the invention will be described with reference to FIG. 3. Assuming now that the vehicle has two degrees of freedom, the first degree of freedom providing the yaw motion corresponding to a rotation of the vehicle about its gravity center. The second degree of freedom provides the lateral motion of the vehicle. The following equations of yaw and lateral motions are obtained for an instant (t):

$$Iz \cdot \ddot{\phi}(t) = Cf \cdot Lf - Cr \cdot Lr + Tf \cdot \frac{B_{FL}(t) - B_{FR}(t)}{2} \quad (1)$$

$$M \cdot \dot{V}y(t) = 2(Cf + Cr) - M \cdot Vx(t) \cdot \dot{\phi}(t) \quad (2)$$

where Iz is the yaw inertia moment of the vehicle, $\psi$ is the yaw rate, Lf is the distance between the gravity center of the vehicle and the front axle, Lr is the distance between the vehicle gravity center and the rear axle, Tf is the distance between the front wheels, $B_{FR}(t)$ is the braking force applied to the left front wheel, $B_{FR}(t)$ is the braking force applied to the right front wheel, M is the weight of the vehicle, Vy is the speed of lateral motion of the vehicle, $\dot{V}y(t)$ is the acceleration of lateral motion of the vehicle, Vx is the speed of longitudinal motion of the vehicle, and Cf and Cr are the cornering forces of the front and rear wheels. The cornering forces Cf and Cr are given as $$Cf = Kf \cdot \left( \frac{\theta(t)}{N} - \frac{Vy + Lf \cdot \dot{\phi}(t)}{Vx(t)} \right) \quad (3)$$

$$Cr = Kr \cdot \left( \delta r(t) - \frac{Lr \cdot \dot{\phi}(t)}{Vx(t)} \right) \quad (4)$$

where $\theta(t)$ is the steering angle, N is the steering gear ratio, Kr is the front-wheel cornering power, Kr is the rear-wheel cornering power, and $\delta r(t)$ is the rear-wheel steering angle.

Substituting Equations (3) and (4) into Equations (1) and (2) gives $$\ddot{\phi}(t) = a11 \cdot \dot{\phi}(t) + a12 \cdot Vy(t) + bf1 \cdot \theta(t) + br1 \cdot \delta r(t) + bp1 \cdot \Delta Bf(t) \quad (5)$$

$$\dot{V}y(t) = a21 \cdot \dot{\phi}(t) + a22 \cdot Vy(t) + bf2 \cdot \theta(t) + br2 \cdot \delta r(t) \quad (6)$$

where $$\Delta Bf(t) = B_{FL}(t) - B_{FR}(t) \quad (7)$$

$$a11 = -2(Kf \cdot Lf + Kr \cdot Lr)/(Iz \cdot Vx) \quad (8)$$

$$a12 = -2(Kf \cdot Lf - Kr \cdot Lr)/(Iz \cdot Vx) \quad (9)$$

$$a21 = -2(Kf \cdot Lf - Kr \cdot Lr)/(M \cdot Vx) - Vx \quad (10)$$

$$a22 = -2(Kf + Kr)/(M \cdot Vx) \quad (11)$$

$$bf1 = 2 \cdot Kf \cdot Lf/(Iz \cdot N) \quad (12)$$

$$bf2 = 2 \cdot Kf/(M \cdot N) \quad (13)$$

$$br1 = -2 \cdot Kr \cdot Lr/Iz \quad (14)$$

$$br2 = 2 \cdot Kr/M \quad (15)$$

$$bp1 = Tf/(2 \cdot Iz) \quad (16)$$

Using a differential operator S, Equations (5) and (6) may be modified to give the produced yaw rate $\dot{\psi}1$ in relation to the steering angle $\theta(t)$.

$$\dot{\phi}1(t) = \frac{bf1 \cdot S + (a12 \cdot bf2 - a22 \cdot bf1)}{S^2 - (a11 + a22)S + (a11 \cdot a22 - a12 \cdot a21)} \theta(t) \quad (17)$$

$$= X(S) \cdot \theta(t)$$

Similarly, the relationship of the produced lateral speed Vy1(t) with respect to the steering angle $\theta(t)$ is given as $$Vy1(t) = \frac{bf2 \cdot S + (a21 \cdot bf1 - a11 \cdot bf2)}{S^2 - (a11 + a22)S + (a11 \cdot a22 - a12 \cdot a21)} \theta(t) \quad (18)$$

$$= Y(S) \cdot \theta(t)$$

where X(S) and Y(S) are the transfer functions taken in the form of (an equation of the first degree)/(an equation of the second degree). It is apparent from Equations (17) and (18) that the tendency of the produced yaw rate $\dot{\psi}1(t)$ and the lateral speed Vy1(t) to oscillate with respect to the steering angle $\theta(t)$ increases so as to degrade the vehicle steering performance as the vehicle speed Vx increases. It has been proposed to control the rear-wheel steering angle in such a manner that the produced yaw rate agrees well with a target yaw rate $\dot{\psi}r(t)$. Assuming now that the target yaw rate $\dot{\psi}r(t)$ has a first order lag without any over- and under-shoot with respect to the steering angle $\theta(t)$ and its steady value is equal to that for normal vehicles in the absence of vehicle braking, the target yaw rate $\dot{\psi}r(t)$ is given by $$\dot{\psi}r(t) = Ho\theta(t)/(1+\tau 1 \cdot S) \tag{19}$$

where Ho is the steady yaw rate gain obtained in the absence of vehicle braking. The steady yaw rate gain is given by $$Ho = Vx/(1+A \cdot Vx^2) \cdot L \cdot N) \tag{20}$$

where L is a wheel base, and A is a stability factor given by $$A = \frac{-M(Lf \cdot Kf - Lr \cdot Kr)}{2 \cdot L^2 \cdot Kf \cdot Kr} \tag{21}$$

Description will be made to the manner in which the rear-wheel steering angle is controlled to realize the target yaw rate $\dot{\psi}r(t)$ as expressed in Equation (19). Equation (19) may be modified to obtain Equation (22) which gives the differentiated values $\ddot{\psi}r(t)$ of the target yaw rate.

$$\ddot{\psi}r(t) = Ho \cdot \theta(t)/\tau 1 - \dot{\psi}r(t)/\tau 1 \tag{22}$$

If the produced yaw rate $\dot{\psi}(t)$, which results from the steering angle $\theta(t)$ and the rear-wheel steering angle $\delta r(t)$, is equal to the target yaw rate $\dot{\psi}r(t)$, the differentiated value $\ddot{\psi}(t)$ of the produced yaw rate will be equal to the differentiated value $\ddot{\psi}r(t)$ of the target yaw rate. It is assumed that $\dot{\psi}r(t) = \dot{\psi}(t)$ and $\ddot{\psi}r(t) = \ddot{\psi}(t)$ and that the lateral speed Vy(t) is Vyr(t) when $\dot{\psi}r(t) = \dot{\psi}r(t)$ and $\ddot{\psi}r(t) = \ddot{\psi}(t)$. Substituting these values into Equations (5) and (6) gives $$\ddot{\psi}r(t) = a11 \cdot \dot{\psi}r(t) + a12 \cdot Vyr(t) + bf1 \cdot \theta(t) + br1 \cdot \delta r(t) \tag{23}$$

$$\dot{V}yr(t) = a21 \cdot \dot{\psi}r(t) + a22 \cdot Vyr(t) + bf2\theta(t) + br2 \cdot \delta r(t) \tag{24}$$

From Equations (23) and (24), the target rear-wheel steering angle $\delta r(t)$ is given as $$\delta r(t) = \frac{\ddot{\psi}r(t) - a11 \cdot \dot{\psi}r(t) - a12 \cdot Vyr(t) - bf1 \cdot \theta(t)}{br1} \tag{25}$$

It is, therefor, possible to bring the produced yaw rate into coincidence with the target yaw rate without the tendency of the vehicle lateral speed to oscillate regardless of the longitudinal vehicle speed Vx by controlling the rear-wheel steering angle to a target value calculated from Equation (25).

Figure 5:
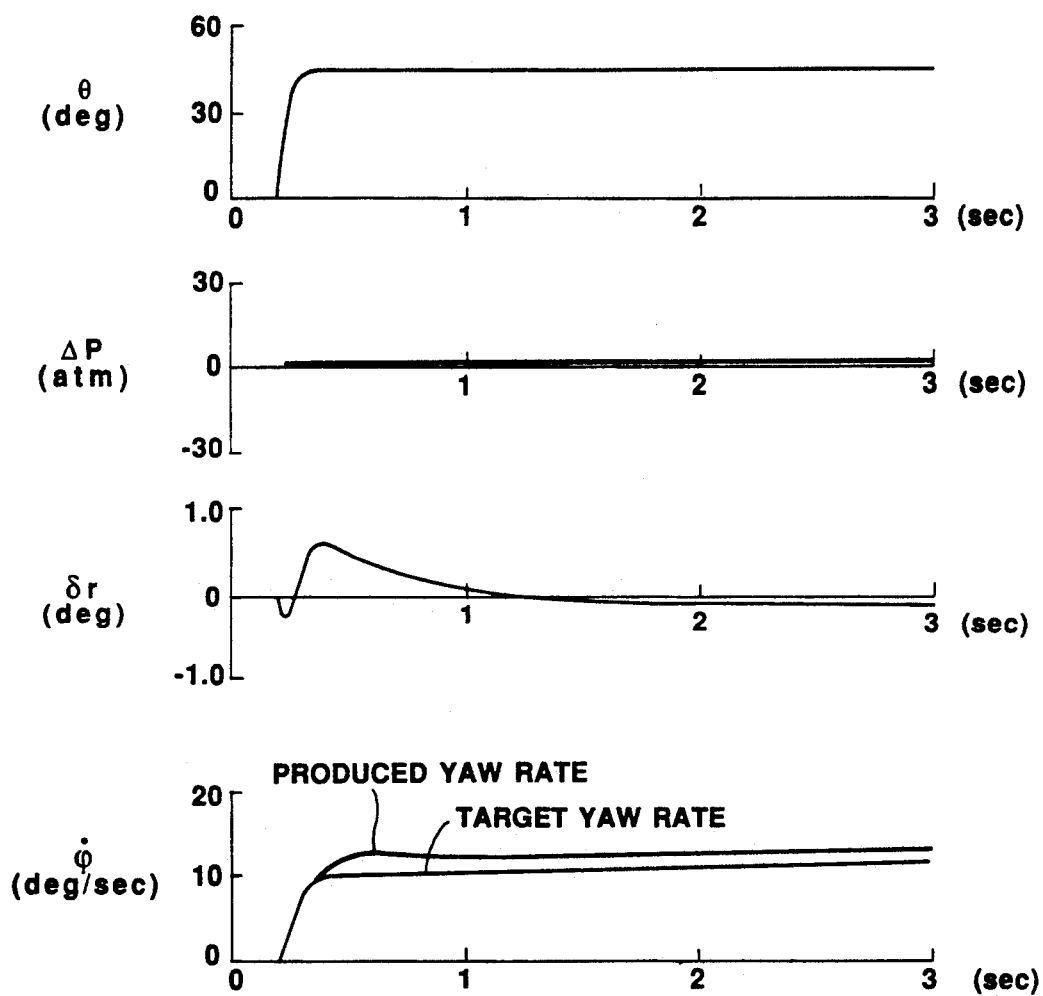
FIG. 5 is a time chart used in explaining the operation of the vehicle dynamic characteristic control apparatus of the invention.

During vehicle braking, however, the tire frictional forces serve to brake the vehicle and the front- and rear-wheel cornering powers Kf and Kr change from those produced in the absence of vehicle braking. As a result, the transient and steady characteristics of the produced yaw rate and vehicle lateral speed are different in the presence of vehicle braking than in the absence of vehicle braking for the same vehicle speed. For this reason, it is impossible, during vehicle braking, to bring the produced yaw rate into coincidence with the target yaw rate merely by controlling the rear-wheel steering angle to a target value calculated from Equation (25), as shown in FIG. 5.

Figure 4:
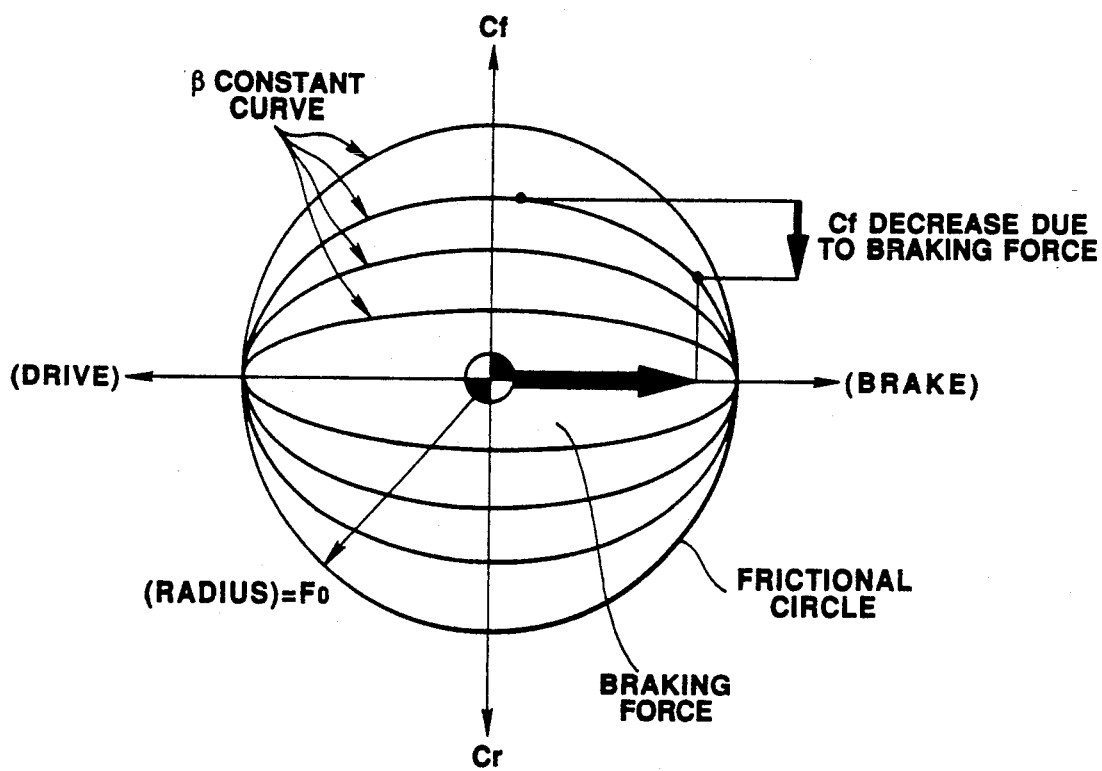
FIG. 4 is a diagram showing the relationship between braking, driving and cornering forces.
Figure 6:
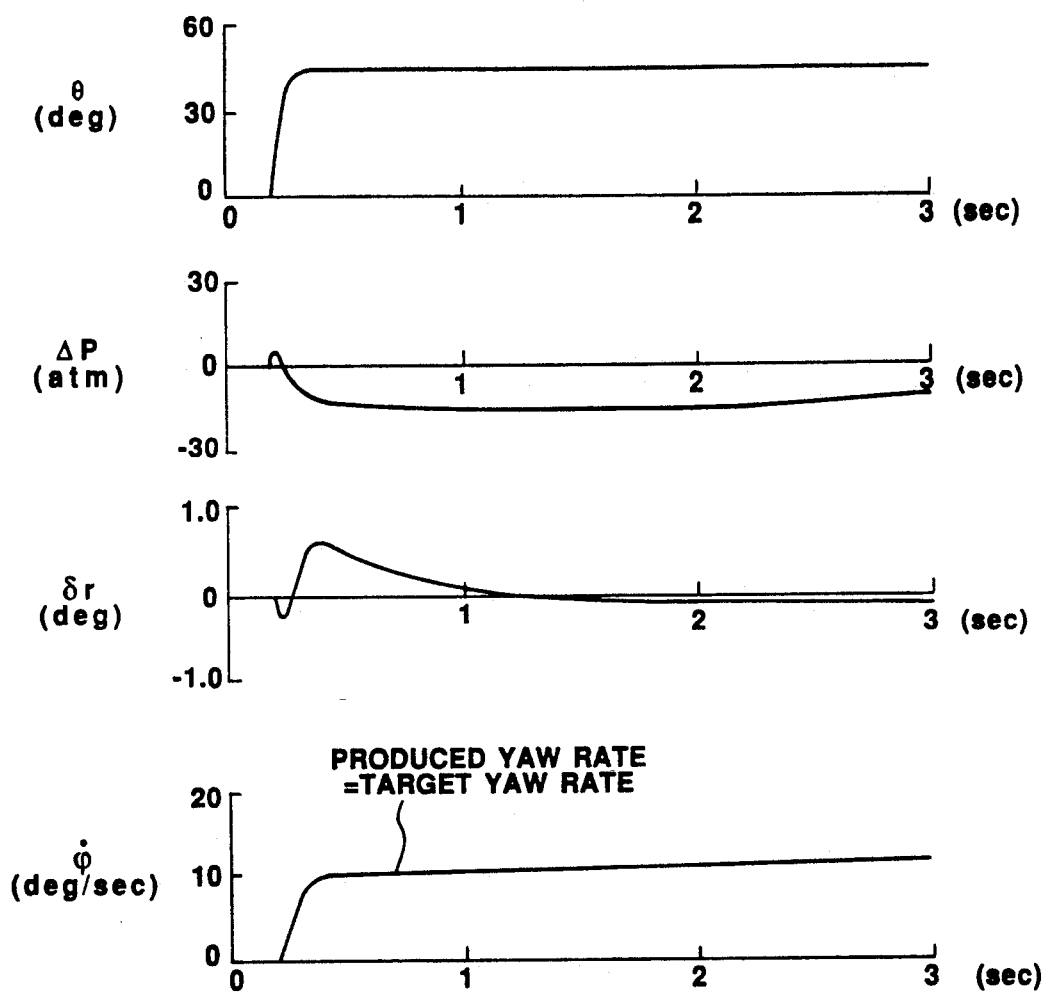
FIG. 6 is a time chart used in explaining the operation of a conventional vehicle dynamic characteristic control apparatus.

According to the invention, the produced yaw rate is brought into coincidence with the target value by providing a difference between the braking force applied to the left wheel and the braking force applied to the right wheel in the presence of vehicle braking, as shown in FIG. 6. FIG. 4 shows a friction circle used to provide the concept of the relationship of the front wheel cornering force Cf with the braking and driving forces. In the presence of a braking force Bf, the cornering power Kf of the front wheels is calculated as follows: Assuming now that the cornering force Cf of the front wheels is proportional to the lateral slip angle $\beta$, the following equation is given:

$$Cfmax = Fo = Kf0 \cdot \beta max \tag{26}$$

where Fo is the maximum possible frictional force produced by the tire, Cfmax is the maximum value of the cornering force Cf, $\beta$max is the lateral slip angle $\beta$ when the cornering force Cf is at the maximum value Cfmax. The maximum cornering force value Cfmax upon application of a braking force Bf is given by $$Cfmax = \sqrt{Fo^2 - Bf^2} = Fo\sqrt{1 - \left(\frac{Bf}{Fo}\right)^2} \tag{27}$$

$$= Kfo\sqrt{1 - \left(\frac{Bf}{Fo}\right)^2} \cdot \beta max$$

Thus, the cornering power Kf of the front wheels upon application of the braking force Bf is given by $$Kf = Kfo\sqrt{1 - \left(\frac{Bf}{Fo}\right)^2} \tag{28}$$

Assuming that the front wheel cornering power Kf is the average value of the cornering powers of the left and right front road wheels, the front wheel cornering power Kf upon application of braking forces $B_{FL}$ and $B_{FR}$ to the left and right front wheels, respectively, is given by $$Kf = \frac{Kfo}{2}\left(\sqrt{1 - \left(\frac{B_{FR}}{Fo}\right)^2} + \sqrt{1 - \left(\frac{B_{FL}}{Fo}\right)^2}\right) \tag{29}$$

Similarly, the cornering power Kf of the rear wheels upon application of the braking force Br is given by $$Kr = Kro\sqrt{1 - \left(\frac{B_{RR}}{Fo'}\right)^2} \tag{30}$$

where Fo' is the maximum possible frictional force produced by the rear wheels and Kro is the rear wheel cornering power in the absence of vehicle braking. The front- and rear-wheel cornering powers Kf and Kr produced during vehicle braking are calculated from Equations (29) and (30). The calculated cornering powers Kf and Kr are substituted into Equations (8) to (15) to calculate various coefficients a'11, a'12, a'21, a'22, b'f1, b'f2, b'r1 and b'r2.

A braking force difference ΔBf(t), which can bring the produced yaw rate to its target value, is calculated. Assuming now that the produced yaw rate, which results from the steering angle θ(t), the rear-wheel steering angle δr(t) calculated from Equation (25) and the left- and right-front wheel braking force difference ΔBf(t), is equal to the target value ψr(t) and the vehicle lateral speed Vy(t) is equal to a target value V'yr(t) which is the vehicle lateral speed provided when ψr(t)=ψr(t), Equations (23) and (24) may be written as $$\ddot{\psi}r(t) = a'11 \cdot \dot{\psi}r(t) + a'12 \cdot V'yr(t) + b'f1 \cdot \theta(t) + b'r1 \cdot \delta r(t) + bp1 \cdot \Delta Bf(t) \quad (31)$$

$$\dot{V}yr(t) = a'21 \cdot \dot{\psi}r(t) + a'22 \cdot V'yr(t) + b'f2 \cdot \theta(t) + b'r2 \cdot \delta r(t) \quad (32)$$

Solving Equations (31) and (32) for ΔBf(t) gives $$\Delta Bf(t) = \frac{\ddot{\psi}r(t) - a'11 \cdot \dot{\psi}r(t) - a'12 \cdot V'yr(t) - b'f1 \cdot \theta(t) - b'r1 \cdot \delta r}{bp1} \quad (33)$$

The left- and right-front wheel braking force difference ΔBf(t) is provided to the vehicle to bring the yaw rate to the target value in the presence of vehicle braking. If the moment of inertia of the road wheels is neglected, the relationship between the wheel cylinder pressure P and the braking force Bf is given by $$Bf = \frac{2 \cdot \mu_p \cdot A_p \cdot r_p \cdot P}{R} = k_p \cdot P \quad (34)$$

where $k_p = 2 \cdot \mu_p \cdot A_p \cdot r_p / R$, $\mu_p$ is the coefficient of friction between the brake pad and the disc rotor, Ap is the area of the wheel cylinder, rp is the effective radius of the disc rotor and R is the radius of the tire. Thus, a target pressure difference ΔP(t) between the fluid pressure in the left-front wheel cylinder 1FL and the fluid pressure in the right-front wheel cylinder 1FR is given as $$\Delta P(t) = \Delta Bf(t)/k_p \quad (35)$$

The target wheel cylinder pressures $P_{FL}(t)$ and $P_{FR}(t)$ are calculated based upon the target pressure difference ΔP(t) calculated from Equation (35) and the master cylinder pressure $P_{MC}(t)$. These calculations are made as follows:

| | | |
|---|---|---|
| $P_{FL}(t)$ | = $P_{MC}(t)$ | (ΔP(t) ≧ 0) |
| | = $P_{MC}(t) + \Delta P(t)$ | (ΔP(t) < 0 and $P_{MC}(t) > -\Delta P(t)$) |
| | = 0 | (ΔP(t) < 0 and $P_{MC}(t) \leq -\Delta P(t)$) |
| $P_{FR}(t)$ | = $P_{MC}(t)$ | (ΔP(t) < 0) |
| | = $P_{MC}(t) - \Delta P(t)$ | (ΔP(t) ≧ 0 and $P_{MC}(t) > \Delta P(t)$) |
| | = 0 | (ΔP(t) ≧ 0 and $P_{MC}(t) \leq \Delta P(t)$) |

Figure 7:
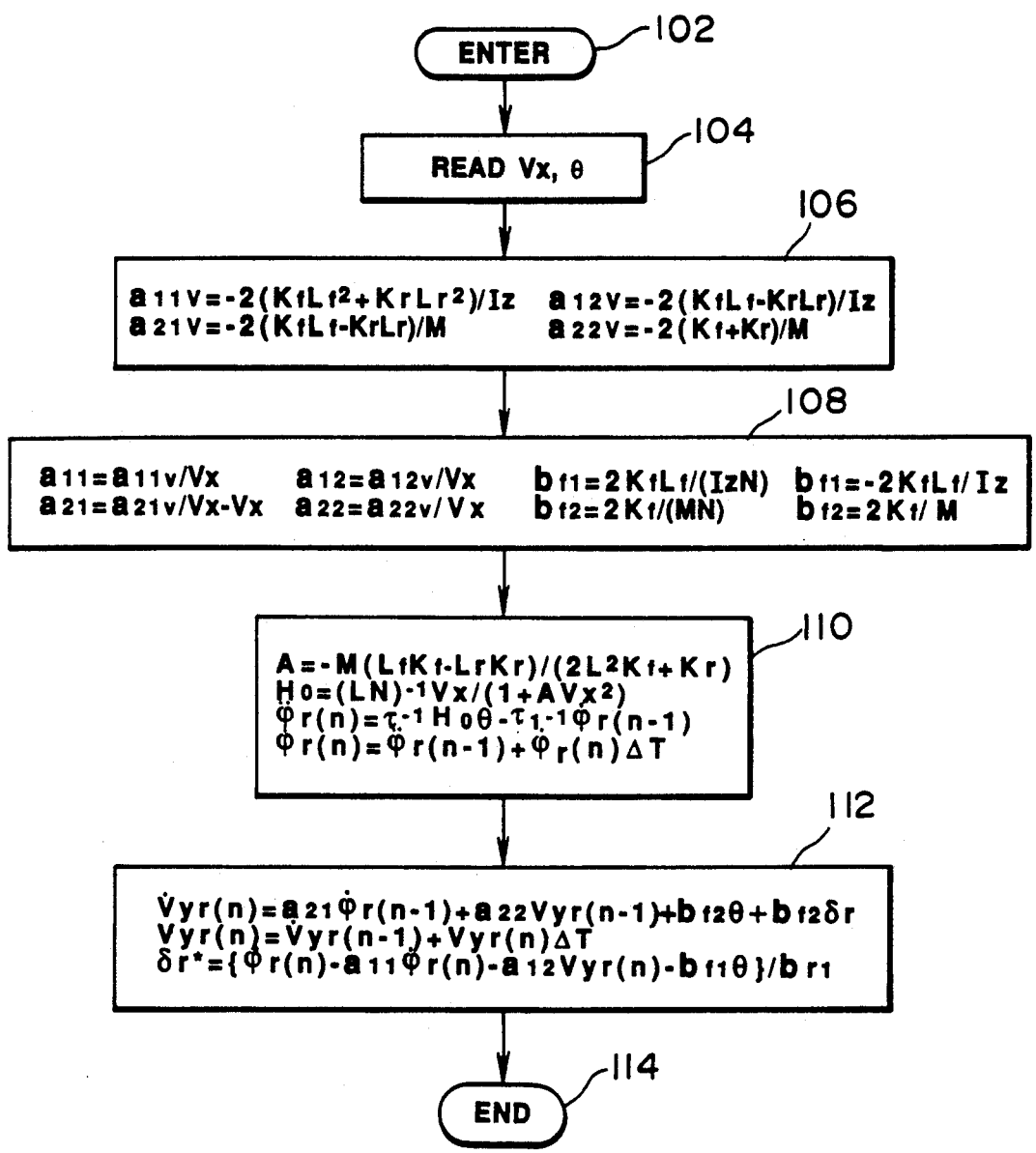
FIG. 7 is a flow diagram showing the programming of the digital computer as it is used to calculate a target value for rear-wheel steering angle.

FIG. 7 is a flow diagram illustrating the programming of the digital computer as it is used to calculate a target value for the rear-wheel steering angle. The computer program is entered at the point 102 at uniform intervals of time ΔT. At the point 104 in the program, the vehicle speed Vx and the steering angle θ are read into the computer memory. At the point 106 in the program, the coefficients a11V, a12V, a21V and a22V from the following equations:

$$a11V = -2 \cdot (Kf \cdot Lf^2 + Kr \cdot Lr^2)/Iz$$

$$a12V = -2 \cdot (Kf \cdot Lf - Kr \cdot Lr)/Iz$$

$$a21V = -2 \cdot (Kf \cdot Lf - Kr \cdot Lr)/M$$

$$a22V = -2 \cdot (Kf + Kr)/M$$

At the point 108 in the program, the coefficients a11, a12, a21, a22, bf1, bf2, br1 and br2 are calculated. The coefficients a11, a12, a21 and a22 are calculated as a11=a11V/x, a12=a12V/Vx, a21=a21V/Vx−Vx, a22=a22V/Vx. The coefficients bf1, bf2, br1 and br2 are calculated as bf1=2·Kf·Lf/(Iz·N), bf2=2·Kf/(M·N), br1=−2·Kr·Lr/Iz, and br2=2·Kr/M. At the point 110 in the program, the steady yaw rate gain Ho is calculated, from Equation (20), based upon the vehicle speed Vx, the stability factor A calculated from Equation (21), the wheel base L and the steering gear ratio N. The calculated steady yaw rate gain Ho is used to calculate the differentiated value ψ̇r(n) of the target yaw rate from Equation (22) Furthermore, the present target yaw rate ψr(n) is calculated, from Equation (36), based upon the new differentiated yaw rate value ψ̇r(n) calculated in the present cycle of execution of this program and the last differentiated yaw rate value ψ̇r(n−1) calculated in the last cycle of execution of the program. The calculated target yaw rate value ψr(n) is used to update the last target yaw rate value stored in the computer memory.

$$\dot{\psi}r(n) = \dot{\psi}r(n-1) + \ddot{\psi}r(n) \cdot \Delta T \quad (36)$$

where ΔT is the time interval between successive entries of this program.

At the point 112 in the program, the target lateral acceleration Vyr(n) is calculated, from Equation (24) based upon the coefficients a21, a22, bf2 and br2 calculated at the point 108, the last target yaw rate ψr(n−1), the last target lateral speed Vyr(n−1) and the rear-wheel steering angle δr. The calculated target lateral speed Vyr(n) is used along with the last lateral acceleration value Vyr(n−1) to calculate the present lateral speed Vyr(n) from Equation (37). The calculated lateral speed value Vyr(n) is used to update the last lateral speed value stored in the computer memory.

$$Vyr(n) = Vyr(n-1) + \dot{V}yr(n) \cdot \Delta T \quad (37)$$

The calculated target lateral speed value Vyr(n) is used to calculate a target rear-wheel steering angle δr* from Equation (41).

$$\delta r^* = \frac{\ddot{\psi}r(n) - a'11 \cdot \dot{\psi}r(n) - a'12 \cdot Vyr(n) - b'f1 \cdot \theta(n)}{b'r1} \quad (38)$$

The control unit 16 controls the control valve 30 to bring the sensed rear-wheel steering angle δr to its target value δr*. Following this, the program proceeds to the end point 114.

This rear-wheel steering control is effective to control the rear-wheel steering angle to its target value in the absence of vehicle braking. However, the yaw rate will be deviated from its target value due to reductions in the cornering powers of the front and rear wheels in the presence of vehicle braking. In order to eliminate the deviation of the yaw rate from its target value, the control unit 16 controls the braking force control unit to provide a difference between the braking force applied to the left wheel and the braking force applied to the right wheel in the presence of braking force.

Figure 8:
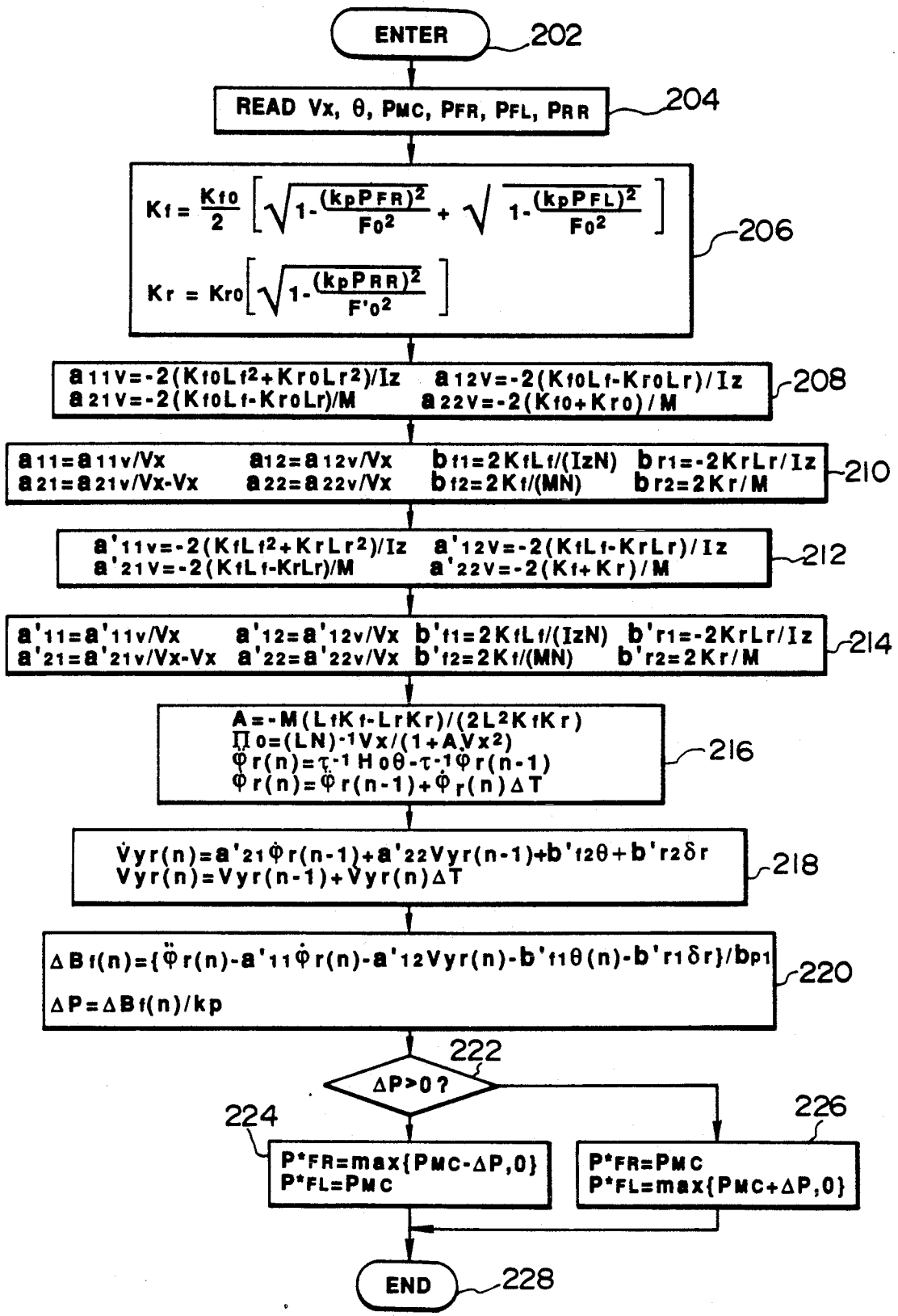
FIG. 8 is a flow diagram showing the programming of the digital computer as it is used to calculate target values for the fluid pressures supplied to the left and right front wheel cylinders.

FIG. 8 is a flow diagram illustrating the programming of the digital computer as it is used to calculate target values $P^*_{FL}$ and $P^*_{FR}$ for the fluid pressures to be supplied to the wheel cylinders 1FL and 1FR. The computer program is entered at the point 202 at uniform intervals of time $\Delta T$. At the point 204 in the program, the vehicle speed Vx, the steering angle $\theta$, the master cylinder pressure $P_{MC}$ and the wheel cylinder pressures $P_{FL}$, $P_{FR}$ and $P_{RR}$ are read into the computer memory. At the point 206 in the program, the front- and rear-wheel cornering powers Kf and Kr produced in the presence of vehicle braking are calculated from Equations (29) and (30). Upon completion of these calculations, the program proceeds to the point 208 where the calculated cornering powers Kf and Kr are used to calculate the coefficients a11V, a12V, a21V and a22V from the following Equations:

$$a11V = -2 \cdot (Kfo \cdot Lf^2 + Kro \cdot Lr^2)/Iz$$

$$a12V = -2 \cdot (Kfo \cdot Lf - Kro \cdot Lr)/Iz$$

$$a21V = -2 \cdot (Kfo \cdot Lf - Kro \cdot Lr)/M$$

$$a22V = -2 \cdot (Kfo + Kro)/M$$

where Kfo and Kro are the front- and rear-wheel cornering powers produced in the absence of vehicle braking.

At the point 210 in the program, the coefficients a11, a12, a21, a22, bf1, bf2, br1 and br2 are calculated for the absence of vehicle braking. The coefficients a11, a12, a21 and a22 are calculated as a11=a11V/Vx, a12=a12V/Vx, a21=a21V/Vx−Vx, a22=a22V/Vx. The coefficients bf1, bf2, br1 and br2 are calculated as bf1=2·Kf·Lf/(Iz·N), bf2=2·Kf/(M·N), br1=−2·Kr·Lr/Iz, and br2=2·Kr/M.

At the point 212 in the program, the coefficients a'11V, a'12V, a'21V and a'22V are calculated from the following equation:

$$a'11V = -2 \cdot (Kf \cdot Lf^2 + Kr \cdot Lr^2)/Iz$$

$$a'12V = -2 \cdot (Kf \cdot Lf - Kr \cdot Lr)/Iz$$

$$a'21V = -2 \cdot (Kf \cdot Lf - Kr \cdot Lr)/M$$

$$a'22V = -2 \cdot (Kf + Kr)/M$$

At the point 214 in the program, the coefficients a'11, a'12, a'21, a'22, b'f1, b'f2, b'r1 and b'r2 are calculated for the presence of vehicle braking. The coefficients a'11, a'12, a'21 and a'22 are calculated as a'11=a'11V/Vx, a'12=a'12V/Vx, a'21=a'21V/Vx−Vx and a'22=a'22V/Vx. The coefficients b'f1, b'f2, b'r1 and b'r2 are calculated as b'f1=2·Kf·Lf/(Iz·N), b'f2=2·Kf/(M·N), b'r1=−2·Kr x Lr/Iz and b'r2=2·Kr/M.

At the point 216 in the program, the steady yaw rate gain Ho provided in the presence of vehicle braking is calculated, from Equation (20), based upon the vehicle speed Vx, the stability factor A calculated from Equation (21), the wheel base L and the steering gear ratio N.

The calculated steady yaw rate gain Ho is used to calculate the differentiated value $\dot\psi r(n)$ of the target yaw rate from Equation (22) Furthermore, the present target yaw rate $\psi r(n)$ is calculated, from Equation (41), based upon the new differentiated yaw rate value $\dot\psi r(n)$ calculated in the present cycle of execution of this program and the last differentiated yaw rate value $\dot\psi r(n-1)$ calculated in the last cycle of execution of the program. The calculated target yaw rate value $\psi r(n)$ is used to update the last target yaw rate value stored in the computer memory.

$$\phi r(n) = \phi r(n-1) + \dot\phi r(n) \cdot \Delta T \tag{39}$$

where $\Delta T$ is the time interval between successive entries of this program.

At the point 218 in the program, the lateral acceleration $\dot V yr(n)$ is calculated, from Equation (24) based upon the coefficients a'21, a'22, b'f2 and b'r2 calculated at the point 214, the last yaw rate $\dot\psi r(n-1)$, the last lateral speed Vyr(n−1) and the rear-wheel steering angle $\delta r$. The calculated lateral acceleration $\dot V yr(n)$ is used to calculate the lateral speed Vyr(n) from Equation (40). The calculated lateral speed value Vyr(n) is used to update the last lateral speed value stored in the computer memory.

$$Vyr(n) = Vyr(n-1) + \dot V yr(n) \cdot \Delta T \tag{40}$$

At the point 220 in the program, the central processing unit calculates a target difference $\Delta Bf(n)$ between the braking forces applied to the left and right front wheels from Equation (35). The calculated target braking force difference value $\Delta Bf$ is used, along with the coefficient kp calculated previously from Equation (37), to calculate a target pressure difference value $\Delta P$ from Equation (35).

At the point 222 in the program, a determination is made as to whether or not the calculated target pressure difference value $\Delta P$ is zero or positive. If $\Delta P \geq 0$, then the program proceeds to the point 224 where the master cylinder pressure $P_{MC}$ is set for the target cylinder pressure $P^*_{FL}$ to be supplied to the wheel cylinder 1FL and a greater one of "0" and the difference $(P_{MC} - \Delta P)$ between the master cylinder pressure $P_{MC}$ and the target pressure difference $\Delta P$ is set for the target cylinder pressure $P^*_{FR}$ to be supplied to the wheel cylinder 1FR. Following this, the program proceeds to the end point 228. If $\Delta P < 0$, then the program proceeds from the point 222 to the point 226 where the master cylinder pressure $P_{MC}$ is set for the target cylinder pressure $P^*_{FR}$ to be supplied to the wheel cylinder 1FR and a greater one of "0" and the difference $(P_{MC} - \Delta P)$ between the master cylinder pressure $P_{MC}$ and the target pressure difference $\Delta P$ for the target cylinder pressure $P^*_{FL}$ to be supplied to the wheel cylinder 1FL. Following this, the program proceeds to the end point 228.

Figure 9:
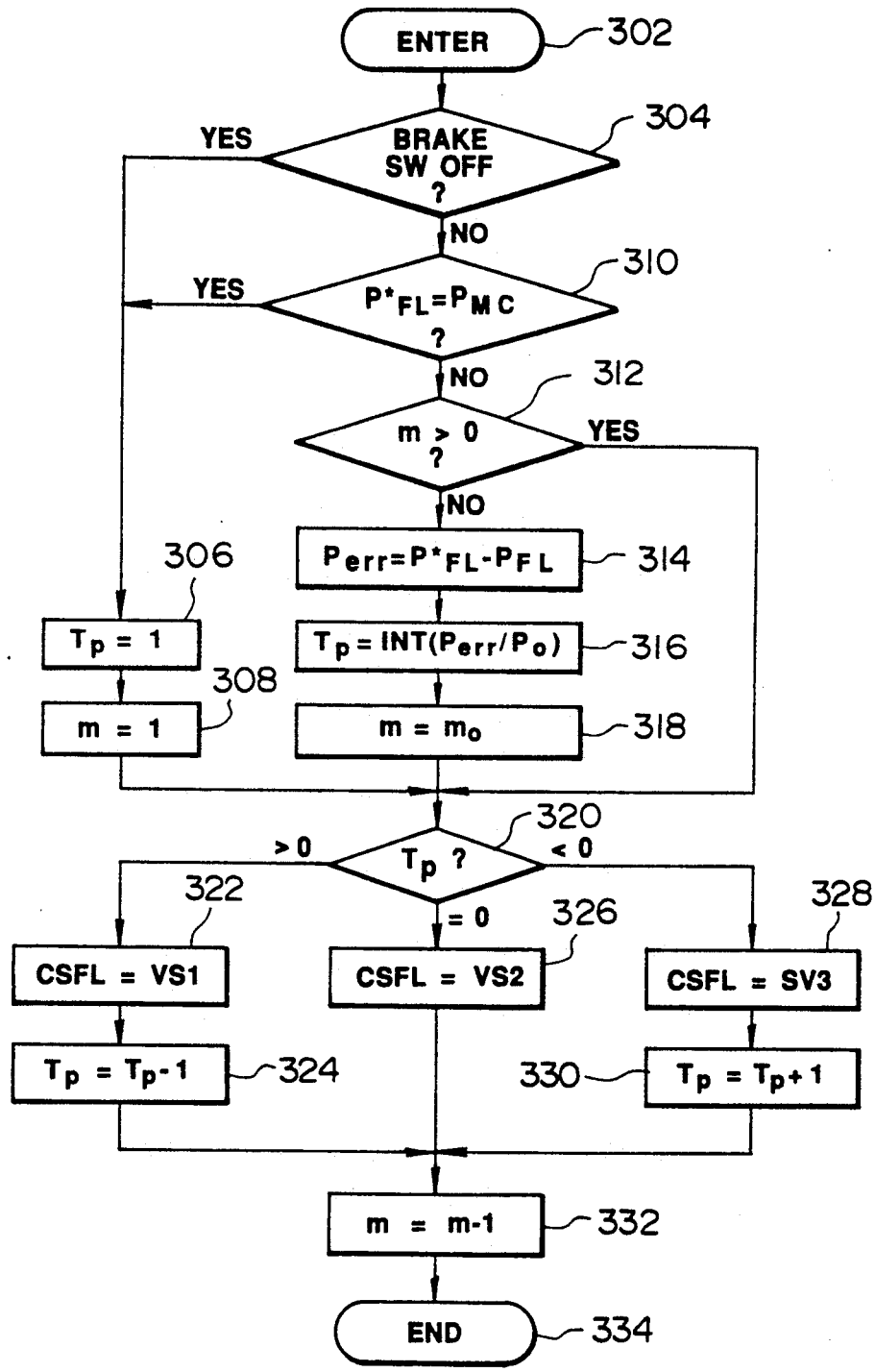
FIG. 9 is a flow diagram showing the programming of the digital computer as it is used to control the fluid pressure introduced to one of the front wheel cylinders.

FIG. 9 is a flow diagram illustrating the programming of the digital computer as it is used to control the fluid pressure introduced to the wheel cylinder 1FL. The computer program is entered at the point 302 at uniform intervals of time $\Delta$. At the point 304 in the program, a determination is made as to whether or not the brake switch 13 is off. If the answer to this question is "yes", then it means the absence of vehicle braking and the program proceeds to the point 306 where a first variable Tp is set at 1 and then to the point 308 where a second variable m is set at 1. The first variable Tp indicates the time interval during which the control signal to be described later is retained, and the second variable m indicates the time intervals at which an error between the actual cylinder pressure $P_{FL}$ and the target cylinder pressure $P^*_{FL}$ is monitored. Upon completion of these settings, the program proceeds to the point 320.

If the brake switch 13 is on, then it means that brakes are applied to the vehicle and the program proceeds from the point 304 to another determination step at the point 310. This determination is as to whether or not the target cylinder pressure $P^*_{FL}$ calculated in the program of FIG. 8 is equal to the master cylinder pressure $P_{MC}$. If the answer to this question is "yes", then the program proceeds to the point 306. Otherwise, the program proceeds to the point 312.

At the point 312 in the program, a determination is made as to whether or not the second variable m is greater than zero. If the answer to this question is "yes", then the program proceeds to the point 320. Otherwise, the program proceeds to the point 314 where an error Perr ($=P^*_{FL}-P_{FL}$) between the actual and target values of the pressure applied to the wheel cylinder 1FL and then to the point 316 where the first variable Tp is calculated as $$Tp=INT(Perr/Po)$$

where Po is a reference value indicating an acceptable range and INT means to round to the nearest whole number. At the point 318 in the program, the second variable m is set at a predetermined value mo. Upon completion of this setting, the program proceeds to the point 320.

At the point 320 in the program, a determination is made as to whether the first variable Tp is positive, negative or zero. If the first variable Tp is positive, then the program proceeds to the point 322 where a command is produced to output a control signal CSFL having a first value VS1 causing the constant current circuit to hold the solenoid valve 3FL in the first position increasing the fluid pressure to the wheel cylinder 1FL and then to the point 326 where 1 is subtracted from the first variable Tp. The new value (Tp−1) of the first variable is used to update the last first variable value stored in the computer memory. Following this, the program proceeds to the point 332.

If the first variable Tp is zero, then the program proceeds from the point 320 to the point 326 where a command is produced to output a control signal CSFL having a second value VS2 causing the constant current circuit to move the solenoid valve 3FL to the second position retaining the fluid pressure in the wheel cylinder 1FL. Following this, the program proceeds to the point 332.

If the first variable Tp is negative, then the program proceeds to the point 328 where a command is produced to output a control signal CSFL having a third value VS3 causing the constant current circuit to move the solenoid valve 3FL to the third position decreasing the fluid pressure in the wheel cylinder 1FL and then to the point 330 where 1 is added to the first variable Tp. The new value (Tp+1) is used to update the last value of the first variable stored in the computer memory. Following this, the program proceeds to the point 332.

At the point 332 in the program, 1 is subtracted from the second variable m. The new value (m−1) of the second variable is used to update the last second variable value stored in the computer memory. Following this, the program proceeds to the end point 334.

A similar program is executed separately at uniform intervals of time ΔT for controlling the fluid pressure introduced to the wheel cylinder 1FR.

When the vehicle is traveling in the absence of vehicle braking, the brake switch 13 is off and the first variable Tp is set at 1. As a result, the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. Since the master cylinder pressure discharged from the master cylinder 5 is zero in the absence of vehicle braking, the pressures in the wheel cylinders 1FL and 1FR are zero so that no braking force is produced.

When the brake pedal 4 is depressed, a determination is made as to whether or not the target cylinder pressures $P^*_{FL}$ and $P^*_{FR}$ calculated in the program of FIG. 8 are equal to the master cylinder pressure $P_{MC}$ discharged from the master cylinder 5. This determination corresponds to a determination whether the vehicle is moving in a straight line or turning in a circle. If the vehicle is moving in a straight line, the target cylinder pressure $P^*_{FL}$ and $P^*_{FR}$ will be set at a value equal to the master cylinder pressure $P_{MC}$, as described in connection with the program of FIG. 8, and the control signal CSFL has a first value VS1 causing the solenoid valve 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. As a result, the cylinder pressures $P_{FL}$ and $P_{FR}$ in the respective wheel cylinders 1FL and 1FR increase to a value equal to the master cylinder pressure $P_{MC}$. For this reason, substantially the same braking force is produced in the wheel cylinders 1FL and 1FR.

If the brake pedal 4 is depressed while the vehicle is turning in a circle or if the vehicle turns with the brake pedal 4 being depressed, the target cylinder pressure $P^*_{FL}$ (or $P^*_{FR}$) will be set at a value equal to the master cylinder pressure $P_{MC}$ minus the target pressure difference ΔP, as described in connection with the program of FIG. 8. Since the second variable m is set at zero at the point 332 during the last cycle of execution of the program of FIG. 9, an error Perr between the actual cylinder pressure $P_{FL}$ (or $P_{FR}$) sensed by the pressure sensor 14FL (or 14FR) and the target cylinder pressure $P^*_{FL}$ (or $P^*_{FR}$) is calculated at the point 314 in the program of FIG. 9, and the first variable Tp is set at a value INT(Perr/Po) at the point 316 in the program of FIG. 9, and the second variable m is set at a predetermined value mo at the point 318 in the program of FIG. 9.

If the actual cylinder pressure $P_{FL}$ (or $P_{FR}$) is less than the target cylinder pressure $P^*_{FL}$ (or $P^*_{FR}$), the first variable Tp will be positive. Consequently, the control signal CSFL has a first value VS1 causing the solenoid value 3FL to be held in the first or normal position providing communication between the master cylinder 5 and the wheel cylinder 1FL, whereas the control signal CSFR has a first value VS1 causing the solenoid valve 3FR to be held in the first or normal position providing communication between the master cylinder 5 and the wheel cylinder 1FR. This pressure increasing mode continues until the first variable Tp is reduced to zero at the point 324 in the program of FIG. 9.

When the first variable Tp reaches zero, the control signal CSFL (or CSFR) has a second value VS2 causing the solenoid valve 3FL (or 3FR) to move to the second position interrupting communication between the master cylinder 5 and the wheel cylinder 1FL (or 1FR) so as to retain the fluid pressure $P_{FL}$ (or $P_{FR}$) in the wheel cylinder 1FL (or 1FR) at a constant value. This pressure retaining mode continues until the second variable m is reduced to zero at the point 334 in the program of FIG. 9.

When the second variable m reaches zero, an error Perr between the actual cylinder pressure $P_{FL}$ (or $P_{FR}$) sensed by the pressure sensor 14FL (or 14FR) and the target cylinder pressure $P^*_{FL}$ or ($P^*_{FR}$) is calculated at the point 314 in the program of FIG. 9, and the first variable Tp is set at a value INT(Perr/Po) at the point 316 in the program of FIG. 9, and the second variable m is set at a predetermined value mo at the point 318 in the program of FIG. 9. When the error Perr decreases to a value less than one-half of the reference pressure Po, the first variable Tp is set at zero and thus the pressure retaining mode is selected so that the cylinder pressure $P_{FL}$ (or $P_{FR}$) is retained at the target cylinder pressure $P^*_{FL}$ (or $P^*_{FR}$). When the cylinder pressure $P_{FL}$ (or $P_{FR}$) in the wheel cylinder 1FL (or 1FR) is greater than the target cylinder pressure $P^*_{FL}$ (or $P^*_{FR}$), the error Perr is negative and thus the first variable Tp is negative. As a result, the control signal CSFL (or CSFR) has a third value VS3 causing the solenoid valve 3FL (or 3FR) to move to the third position providing communication of the wheel cylinder 1FL (or 1FR) to the master cylinder 5 through the pump 7F so as to reduce the cylinder pressure $P_{FL}$ (or $P_{FR}$) in the wheel cylinder 1FL (or 1FR). This pressure reduction mode continues until the first variable Tp is reduced to zero.

In such a manner, the cylinder pressures $P_{FL}$ and $P_{FR}$ in the wheel cylinders 1FL and 1FR can be adjusted to the target cylinder pressures $P^*_{FL}$ and $P^*_{FR}$, respectively.

The rear-wheel steering control is utilized to control the yaw rate to its target value. However, the yaw rate is deviated from its target value, as shown in FIG. 5, due to wheel cornering power reductions in the presence of vehicle braking. The braking force control can eliminate the deviation of the yaw rate from its target value, as shown in FIG. 6.

Although the invention has been described in connection with rear-wheel steering control, it is to be noted, of course that front- and/or rear- wheel steering control may be utilized to control the yaw rate. In addition, the vehicle dynamic characteristic control apparatus of the invention may be arranged to provide a difference between the braking force applied to the left-rear wheel and the braking force applied to the right-rear wheel to control the vehicle lateral speed. In order to take into account the influence of load shift to the front wheels, the vehicle longitudinal acceleration may be used, along with the wheel cylinder pressures, to calculate the cornering powers in the presence of vehicle braking.

What is claimed is:

1. A vehicle dynamic characteristic control apparatus for use with an automotive vehicle having a steering wheel supported on a pair of front wheels and a pair of rear wheels, the apparatus comprising:
   a first unit for controlling a steering angle of one of the wheel pairs;
   a second unit for controlling braking forces to be applied to left and right wheels of at least one of the wheel pairs;
   sensor means for sensing the steering angle of the steering wheel and vehicle speed of the vehicle and for providing sensor signals indicative of the sensed steering angle and the sensed vehicle speed; and
   a third unit coupled to the sensor means for controlling the first and second units, the third unit including first means for calculating a target value for a dynamic parameter related to a motion of the vehicle based upon the sensed steering angle and vehicle speed, the first means controlling the first unit to bring the dynamic parameter to the target value, and second means operable in the presence of vehicle braking for calculating changes in cornering powers of the respective wheel pairs with respect to the cornering powers obtained in the absence of vehicle braking and for calculating a difference between the braking force applied to the left wheel and the braking force applied to the right wheel based upon the calculated cornering power changes, the second means controlling the second unit to provide the calculated difference so as to cancel an influence of the cornering power changes on the dynamic parameter.

2. The vehicle dynamic characteristic control apparatus as claimed in claim 1, wherein the dynamic parameter is a vehicle yaw rate.

3. The vehicle dynamic characteristic control apparatus as claimed in claim 1, wherein the sensor means includes a first sensor sensitive to a steering wheel position for providing a signal indicative of a sensed vehicle steering condition, and a second sensor sensitive to a vehicle longitudinal speed for producing a signal indicative of a sensed vehicle longitudinal speed.

4. The vehicle dynamic characteristic control apparatus as claimed in claim 3, wherein the first means includes means for calculating the target value from a vehicle model specifying the target value as a function of the sensed vehicle steering condition and the sensed vehicle longitudinal speed, the vehicle model being derived from an equation of yaw moment of the vehicle and an equation of lateral motion of the vehicle.

5. The vehicle dynamic characteristic control apparatus as claimed in claim 1, wherein the second means includes means for calculating a target braking force difference value, and means for controlling the second unit to bring the braking force difference to the calculated target braking force difference value.

6. A vehicle dynamic characteristic control apparatus for an automotive vehicle supported on a pair of front wheels and a pair of rear wheels, comprising:
   a first unit for controlling a steering angle of one of the wheel pairs;
   a second unit for controlling braking forces applied to a pair of left and right wheels of at least one of the wheel pairs; and
   a third means for controlling the first and second units, wherein the third unit calculates a target value for a dynamic parameter related to a motion of the vehicle based upon the sensed vehicle operating conditions and controls the first unit to bring the dynamic parameter to the target value, and wherein during a vehicle braking operation, the third unit calculates changes in cornering power of the respective wheel pairs with respect to cornering power of the respective wheel pairs obtained in the absence of vehicle braking, calculates a difference between the braking force applied to the left wheel and the braking force applied to the right wheel based upon the calculated cornering power changes, and controls the second unit based upon the calculated difference, to cancel an influence of the cornering power changes on the dynamic parameter.

* * * * *